United States Patent
Yamada

(10) Patent No.: US 9,884,434 B2
(45) Date of Patent: Feb. 6, 2018

(54) CLIP FIXING JIG

(71) Applicant: TOYO TIRE & RUBBER CO., LTD., Osaka-shi, Osaka (JP)

(72) Inventor: Hiroshi Yamada, Osaka (JP)

(73) Assignee: TOYO TIRE & RUBBER CO., LTD., Itami-shi, Hyogo (JP)

( * ) Notice: Subject to any disclaimer, the term of this patent is extended or adjusted under 35 U.S.C. 154(b) by 542 days.

(21) Appl. No.: 14/528,663

(22) Filed: Oct. 30, 2014

(65) Prior Publication Data
US 2015/0132422 A1 May 14, 2015

(30) Foreign Application Priority Data

Nov. 8, 2013 (JP) ................................ 2013-232500

(51) Int. Cl.
| | |
|---|---|
| B29C 69/02 | (2006.01) |
| B29C 31/00 | (2006.01) |
| B60N 2/58 | (2006.01) |
| B29L 31/00 | (2006.01) |

(52) U.S. Cl.
CPC .......... B29C 31/008 (2013.01); B60N 2/5825 (2013.01); B60N 2/5891 (2013.01); *B29L 2031/7282* (2013.01)

(58) Field of Classification Search
CPC ..... B29C 33/14; B29C 33/16; B29C 44/1228; B29C 44/1233; B29C 44/351; B29C 44/58; B29K 2105/06; B29K 2105/0809; B29L 2031/58
USPC ..... 425/3, 4 R, 111, 121, 123, 817 R, 324.1, 425/394, 453
See application file for complete search history.

(56) References Cited

U.S. PATENT DOCUMENTS

| | | | |
|---|---|---|---|
| 5,005,242 A | 4/1991 | Kennedy et al. | |
| 5,980,230 A * | 11/1999 | Dowd ................. | B29C 67/0044 425/394 |
| 6,460,230 B2 | 10/2002 | Shimamura et al. | |

(Continued)

FOREIGN PATENT DOCUMENTS

| | | |
|---|---|---|
| CN | 1225058 A | 8/1999 |
| CN | 1305759 A | 8/2001 |

(Continued)

OTHER PUBLICATIONS

Office Action dated Jul. 27, 2016, issued in counterpart Chinese Patent Application No. 201410569380.0, with English translation. (12 pages).

(Continued)

*Primary Examiner* — Joseph S Del Sole
*Assistant Examiner* — Thukhanh T Nguyen
(74) *Attorney, Agent, or Firm* — Westerman, Hattori, Daniels & Adrian

(57) ABSTRACT

A clip fixing jig for fixing a clip member in a molding die for molding a seat pad has a wall part erected along a whole outer peripheral edge of a bottom part thereof. The wall part forms, above the bottom part, an accommodation space for accommodating extending parts. The clip fixing jig has fixing parts for detachably fixing a clip member, so that a clip member can be fixed to the clip fixing jig by inserting the clip member in the accommodation space. With a clip fixing jig provided in a molding die, a seat pad can be formed by insert molding, so that workability in clip member fixing work is improved.

8 Claims, 14 Drawing Sheets

(56) References Cited

U.S. PATENT DOCUMENTS

| | | | | |
|---|---|---|---|---|
| 7,837,263 B2* | 11/2010 | Booth | ................ | A47C 7/20 |
| | | | | 297/218.1 |
| 2003/0215601 A1* | 11/2003 | Pedde | ................ | B29C 33/12 |
| | | | | 428/102 |
| 2012/0286445 A1* | 11/2012 | Ohta | ................ | B29C 33/16 |
| | | | | 425/3 |

FOREIGN PATENT DOCUMENTS

| | | | |
|---|---|---|---|
| DE | 102007012879 | B3 | 6/2008 |
| FR | 2777879 | A1 | 10/1999 |
| JP | 2009-45216 | A | 3/2009 |
| JP | 5491100 | B2 | 5/2014 |
| WO | 98/02331 | A1 | 1/1998 |
| WO | 2011/058415 | A1 | 5/2011 |

OTHER PUBLICATIONS

Extended European Search Report dated Jan. 27, 2015, issued in European Application No. 14192013.2. (6 pages).

* cited by examiner

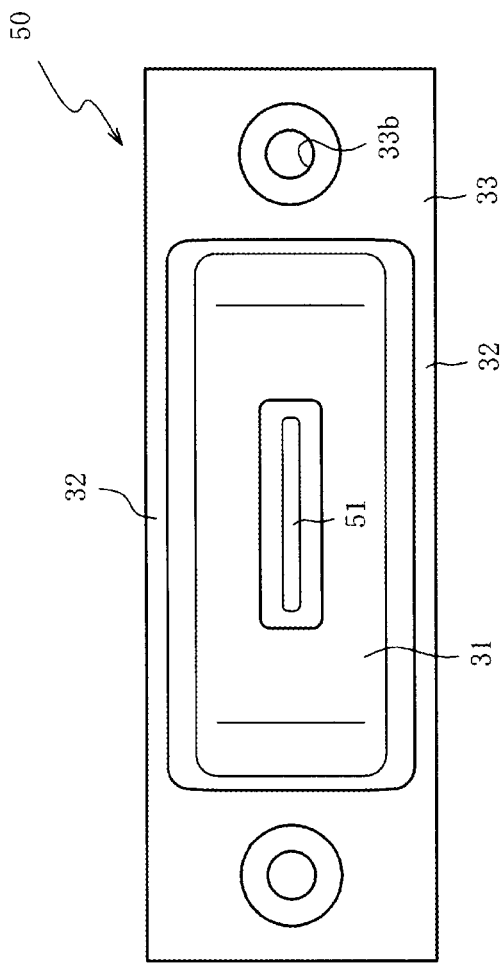
FIG. 10A
FIG. 10B
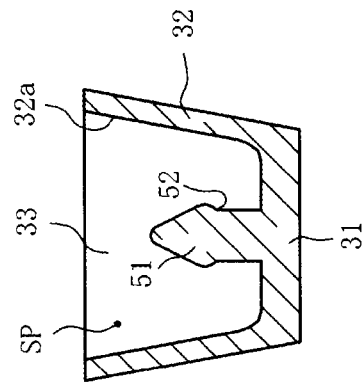
FIG. 10C

CLIP FIXING JIG

TECHNICAL FIELD

The present invention relates to a clip fixing jig and, more particularly, to a clip fixing jig which can improve workability in clip member fixing work.

BACKGROUND ART

There has been a technique in which a portion of a seat cover is, in a state of being hung, put and held in a groove portion formed on the surface of a seat pad, thereby attaching the seat cover, in a state with wrinkles formed in excess portions thereof stretched out, to the seat pad. For example, Patent Literature 1 discloses a technique in which: a linear part, e.g. a wire, is provided in a groove portion of a seat pad; base parts of plural clip members are fixed to plural portions of the linear part; and extending parts having claw-like parts in their end portions are positioned to be extending inside the groove portion. According to the technique, a locking part provided on the reverse side of the seat cover is held by the claw-like parts (clip members) provided at plural locations in the groove portion, allowing a portion of the seat cover to be held, in a state of being hung, in the groove portion.

CITATION LIST

Patent Literature

[Patent Literature 1] JP-A No. 2011-45424

SUMMARY OF INVENTION

Technical Problem

The existing technique described above, however, poses a problem that fixing plural clip members to plural portions of a linear part is cumbersome work involving a large number of work steps.

The present invention has been made to address the above problem, and it is an object of the present invention to provide a clip fixing jig and a seat pad molding die provided with the same that can improve workability in clip member fixing work.

Solution to Problem and Advantageous Effects of Invention

The clip fixing jig according to claim 1 is for fixing a clip member to be partly buried in a seat pad, which has a groove portion for accommodating a portion of a seat cover, in a molding die for molding a seat pad. The clip member has a buried part to be buried in the seat pad and an extending part extending from the buried part into the groove portion. A claw-like part is formed to extend from an end portion of the extending part. The claw-like part catches and holds a catching part provided on the reverse side of the seat pad.

The clip fixing jig for fixing the clip member in the seat pad molding die has a plate-like or annular bottom part with a wall part erected along a whole outer peripheral edge thereof. The wall part forms, above the bottom part, an accommodation space for accommodating the extending part. A fixing part is formed at a predetermined part provided in the accommodation space or formed in the bottom part or in the wall part, and a predetermined part of the clip member is detachably fixed to the fixing part. In this arrangement, the clip member can be fixed to the clip fixing jig by inserting the extending part of the clip member into the accommodation space surrounded by the wall part. With the clip fixing jig provided in a molding die, a seat pad can be formed by insert molding. This generates an effect of improving workability in clip member fixing work.

In the clip fixing jig according to claim 2, mutually opposing inner surfaces of the wall part are inclined such that a distance between the mutually opposing inner surfaces is smaller in a direction from an upper end of the wall part toward the bottom part. This makes it easy to insert the extending part of the clip member between the inner wall surfaces. Hence, in addition to the effect generated according to claim 1, workability in clip member fixing work is further improved.

Also, the wall part is formed to restrict movement of the extending part of the clip member in the direction in which the inner wall surfaces oppose each other. This generates an effect of preventing the clip member from being shifted in the direction in which the inner wall surfaces oppose each other.

In the clip fixing jig according to claim 3, when the extending part of the clip member is accommodated in the accommodation space, the upper end face along a whole upper-end length of the wall part comes into contact with the buried part. This prevents, when the seat pad is foam-molded, the foamed molding material from partly entering the accommodation space of the clip fixing jig. If part of the foamed molding material enters the accommodation space of the clip fixing jig and adheres to the extending part or claw-like part, it may become difficult to have a locking part provided on the reverse side of the seat cover caught by the claw-like part (to attach the seat cover to the seat pad). Since such difficulty is prevented, an effect of securing workability in attaching the seat cover to the seat pad is generated in addition to the effects generated according to claims 1 and 2.

The clip fixing jig according to claim 5, at least the wall part is formed of a magnetic material. The clip member includes plural clips which are each provided with the extending part and the claw-like part and a connection member which is formed of a magnetic material and connects the clips. With the clip fixing jigs, at least the wall part, formed of a magnetic material. The wall part of the clip fixing jigs is magnetized by the magnet and detachably attract the connection member.

With clip fixing jigs arranged in locations of molding die corresponding to the clips. The clip member can be fixed altogether to the clip fixing jigs without requiring the clips to be fixed to the clip fixing jigs one by one. Therefore, in addition to the effect generated according to one of claims 1 to 4, workability in clip member fixing work is greatly improved.

BRIEF DESCRIPTION OF DRAWINGS

FIG. 7a is a sectional view of the clip fixing jig taken along line VIIa-VIIa in FIG. 6a.

FIG. 10a is a plan view of a clip fixing jig; FIG. 10b is a side view of the clip fixing jig; and FIG. 10c is a sectional view of the clip fixing jig taken along line Xc-Xc in FIG. 10b.

DESCRIPTION OF EMBODIMENTS

Figure 1:
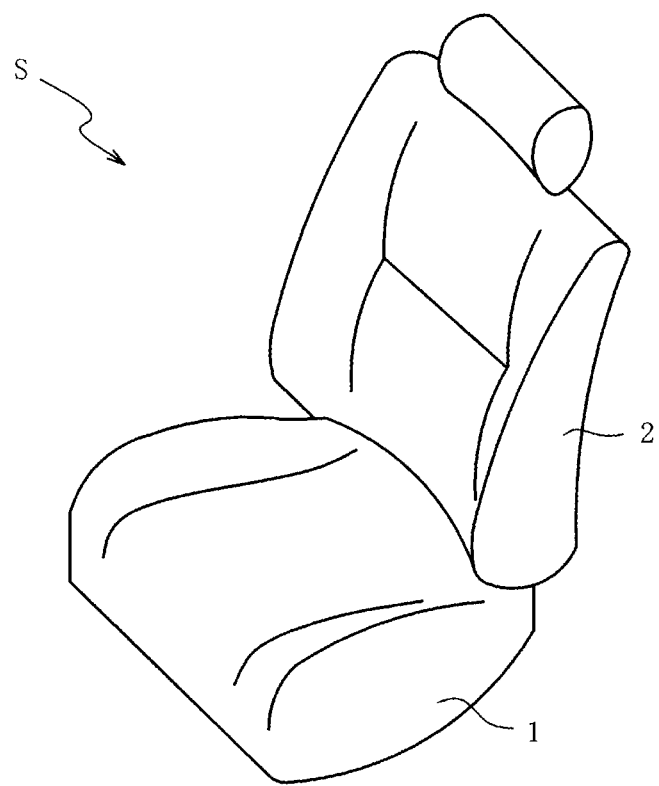
FIG. 1 is a perspective view of a vehicle seat.
Figure 2:
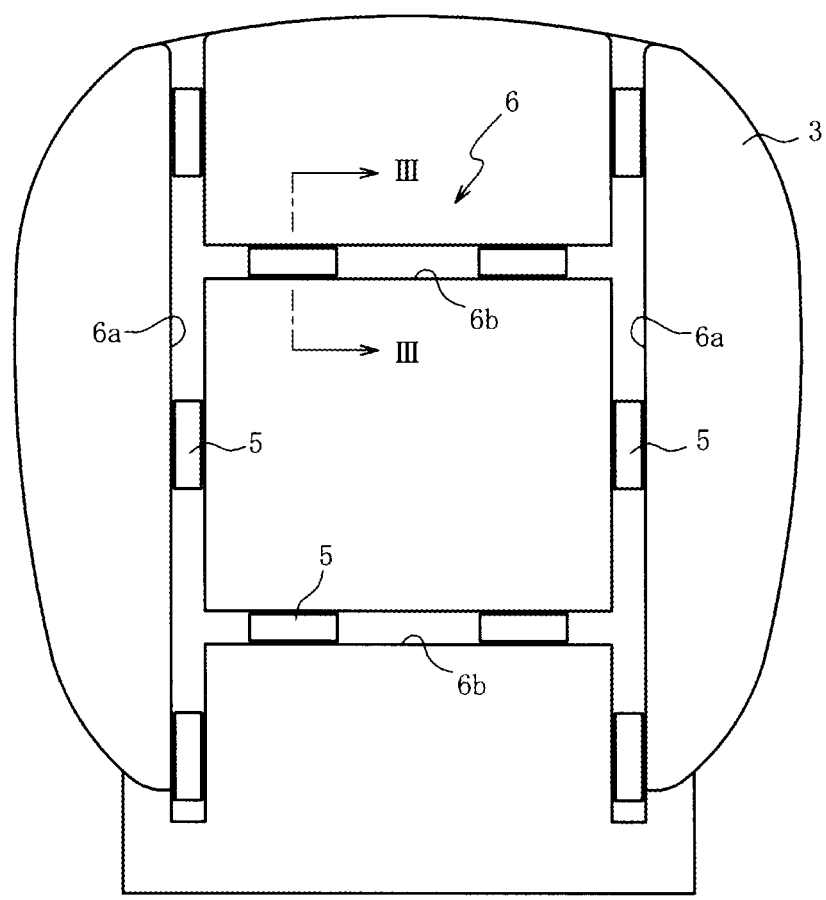
FIG. 2 is a plan view of a seat pad attached with clip members.
Figure 3:
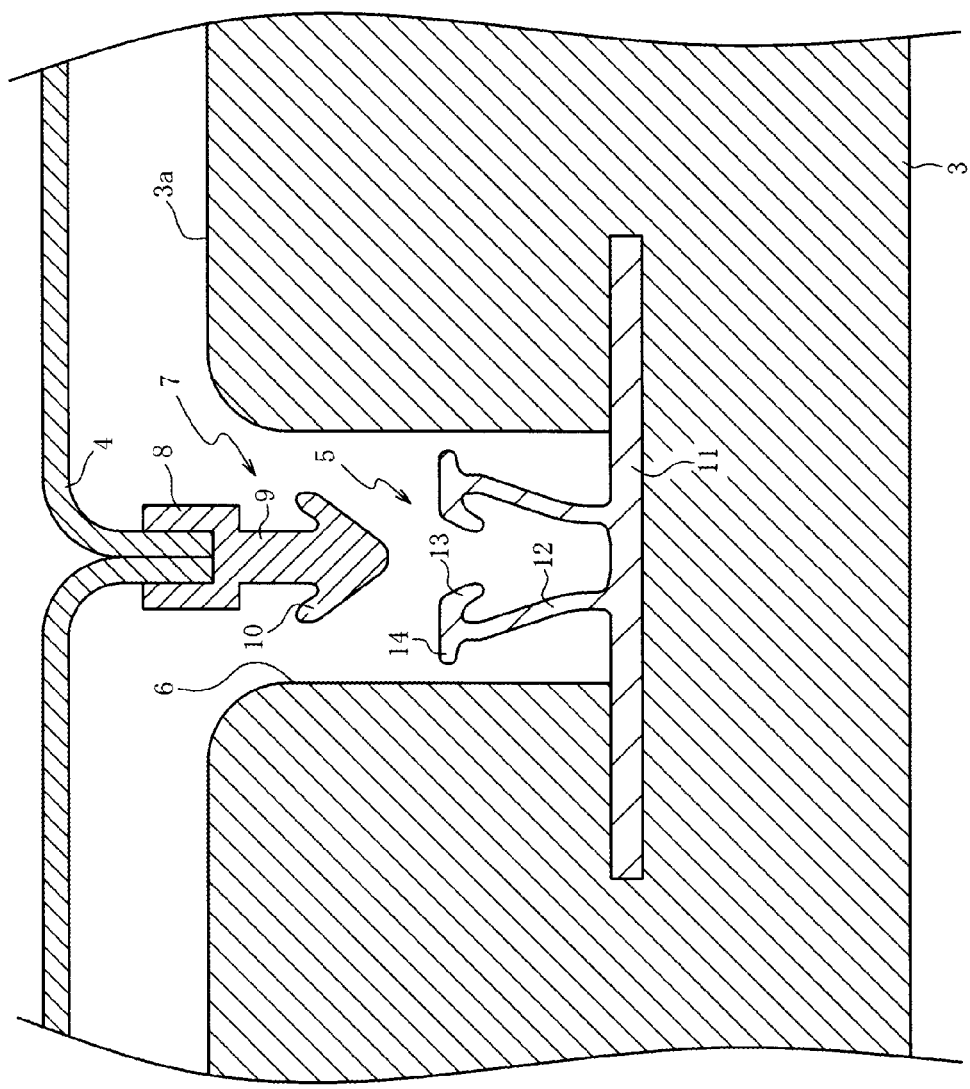
FIG. 3 is a sectional view of the seat pad taken along line III-III in FIG. 2.
Figure 4:
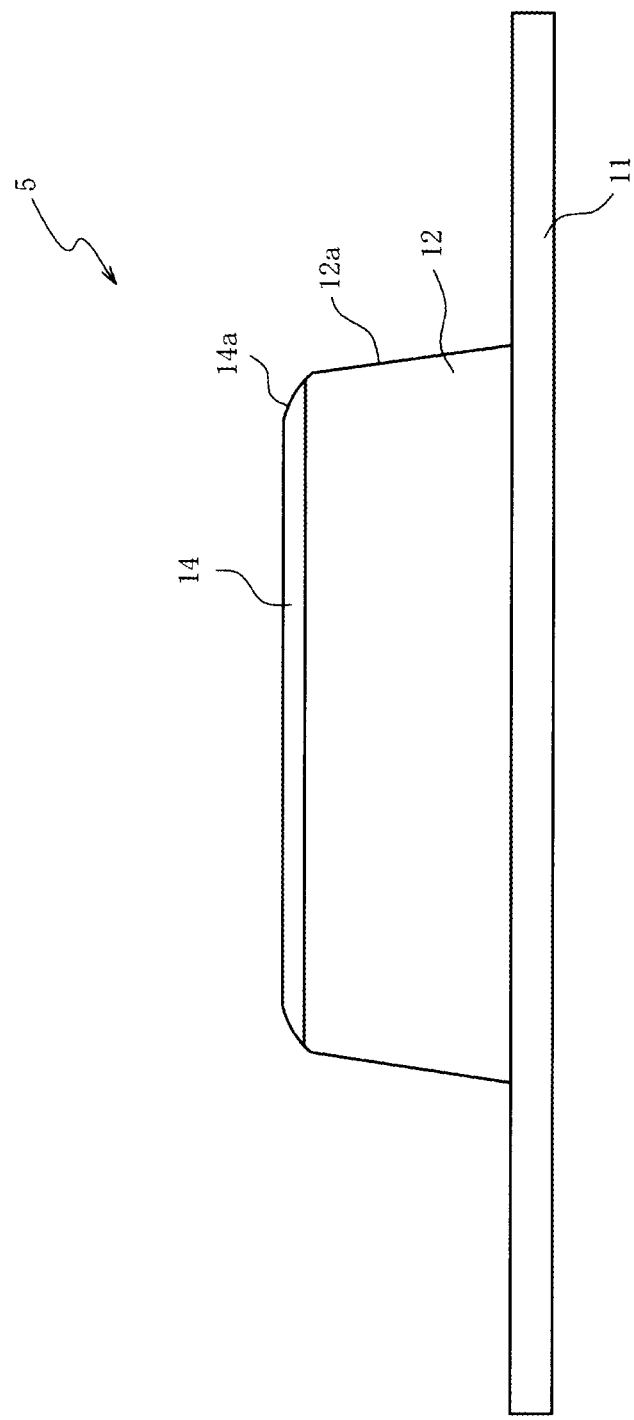
FIG. 4 is a side view of a clip member to be partly buried in the seat pad.

In the following, preferred embodiments of the present invention will be described with reference to the attached drawings. FIG. 1 is a perspective view of a vehicle seat S; FIG. 2 is a plan view of a seat pad 3 attached with clip members 5; FIG. 3 is a sectional view of the seat pad 3 taken along line III-III in FIG. 2; and FIG. 4 is a side view of a clip member 5 to be partly buried in the seat pad 3.

As shown in FIG. 1, the vehicle seat S includes a cushion pad 1 for an occupant to sit on and a back pad 2 to support the back of the occupant. The cushion pad 1 includes the seat pad 3 (see FIG. 3) formed of a foamed synthetic resin such as polyurethane foam, a seat cover 4 to cover a mounting surface 3a on the upper side of the seat pad 3, and the clip members 5 for attaching the seat cover 4 to the seat pad 3. Though not shown, the back pad 2 is structured almost identically to the cushion pad 1.

As shown in FIG. 2, a groove portion 6 is formed on the mounting surface 3a of the seat pad 3. In the present embodiment, the groove portion 6 includes two front-to-back grooves 6a extending in a front-to-back direction along right and left side portions of the seat pad 3 and two lateral grooves 6b extending from left to right. The lateral grooves 6b are each communicated, at both ends thereof, with the front-to-back grooves 6a. The front-to-back grooves 6a and lateral grooves 6b are both attached with clip members 5 spaced apart by a predetermined distance along the front-to-back grooves 6a and lateral grooves 6b (in the groove portion 6), respectively. Note that the groove portion 6 is not limited to the above arrangement.

As shown in FIG. 3, the groove portion 6 formed on the mounting surface 3a of the seat pad 3 has a predetermined depth. The groove portion 6 is for partly accommodating the seat cover 4. The seat cover 4 has a locking part 7 attached to the reverse side thereof along portions thereof corresponding to the groove portion 6. The locking part 7 is for keeping such portions of the seat cover 4 tucked in the groove portion 6. The locking part 7 includes a connection part 8 connected to the seat cover 4 by sewing or bonding and a hook part 9 extending from the connection part 8 on the reverse side of the seat cover 4. The hook part 9 has, in an end portion thereof, a pair of mutually oppositely extending catching parts 10. The catching parts 10 are tapered such that the end portion of each of the catching parts 10 is further away from the hook part 9 toward the base portion of the hook part 9.

The locking part 7 continuously extends in directions approximately in parallel with the directions in which the groove portion 6 extends. That is, the base portion of the hook part 9 is formed like a hanging wall extending approximately in parallel with the directions in which the groove portion 6 extends. The catching parts 10 are each formed to be continuous along the edge portion on each side of the hanging wall.

The clip members 5 are each for holding a portion of the seat cover 4, in a state of being hung, tucked in the groove portion 6 by locking the locking part 7. Each clip member 5 includes a buried part 11 to be buried in the seat pad 3, a pair of extending parts 12 projecting from the buried part 11 and extending in the groove portion 6, a pair of claw-like parts 13 projecting, toward each other, from the end portions of the pair of extending parts 12, respectively, and a pair of guide parts 14 projecting, away from each other, from the end portions of the pair of extending parts 12. Each clip member 5 having the above parts is integrally formed of elastic synthetic resin or elastic metal.

The buried portion 11 is for fixing the clip member 5 in the groove portion 6 of the seat pad 3. It is formed like an approximately flat plate and includes plural through-holes (not shown) formed through the thickness thereof. With the buried part 11 having the through-holes (not shown), the foamed synthetic resin forming the seat pad 3 enters the through-holes thereby generating an anchoring effect to keep the buried part 11 solidly held in the seat pad 3.

The extending parts 12 are a pair of thin-plate like parts projecting from the surface on one side of the buried part 11, are opposed to each other across a predetermined gap and are formed curvedly to be further away from each other in the direction from their base portion toward their end portions. The extending parts 12 each formed like a thin plate can be elastically deformed toward each other or away from each other.

The claw-like parts 13 are for locking the catching parts 10 of the locking part 7 attached to the reverse side of the seat cover 4 and are formed to extend along the longitudinal direction (the direction vertical to the plane of FIG. 3) of the extending parts 12. The upper side of each claw-like part 13 (the upper side as seen in FIG. 3) is downwardly inclined to be lower (to be closer to the bottom of the groove portion 6) toward the end portion thereof. The lower side of each claw-like part 13 (the side on the buried part 11 side) is upwardly inclined to be higher (to be further away from the buried part 11) toward the base portion of the claw-like part 13 (toward the corresponding extending part 12).

The guide parts 14 are for guiding the catching parts 10 of the locking part 7 for insertion between the claw-like parts 13 and extend in the longitudinal direction (the direction vertical to FIG. 3) of the extending parts 12. The guide parts 14 are formed to project from the end portions of the mutually opposing extending parts 12 in the directions away from each other. With the guide parts 14 provided, when inserting the locking part 7 in the clip member 5, the hook part 9 is prevented from entering between the extending part 12 on either side and the inner wall on the corresponding side of the groove portion 6, so that failure to achieve smooth engagement between the catching part 10 and the claw-like part 13 is prevented.

Each of the guide parts 14 is formed such that its upper side (its upper surface as seen in FIG. 3) is approximately horizontal and such that its underside (its surface on the buried part 11 side) is upwardly inclined to be higher (to be further away from the buried part 11) in the direction from its base portion (its portion on the corresponding extending part 12 side) toward its end portion. As shown in FIG. 4, each extending part 12 and each guide part 14 of each clip member 5 have side edges 12a and 14a, respectively, which are taperedly inclined such that the lengths in the longitudinal direction (in the lateral direction in FIG. 4) of the extending part 12 and guide part 14 are smaller in the direction away from the buried part 11. Also, the projection (length of projection) from the extending part 12 of each guide part 14 is smaller than the projection (length of projection) from the extending part 12 of each claw-like part 13.

Figure 5:
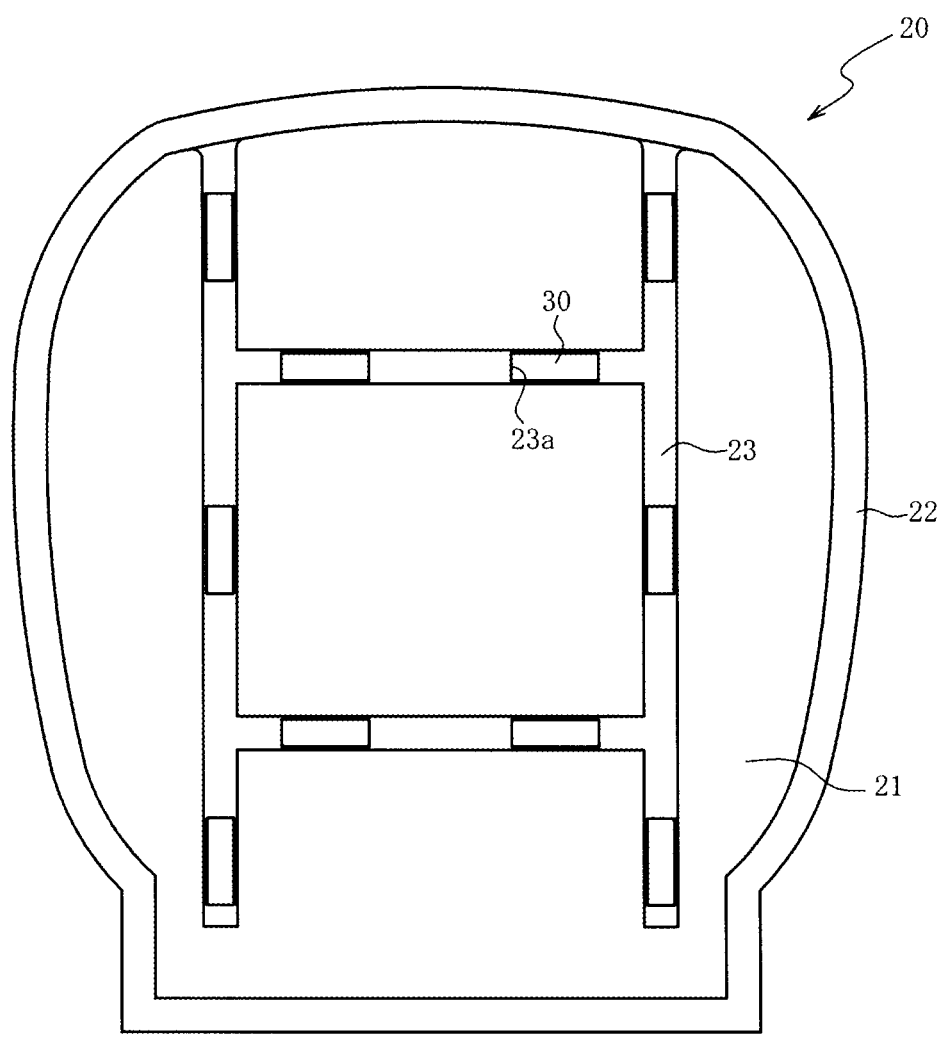
FIG. 5 is a plan view of a seat pad molding die according to a first embodiment of the present invention.

Next, with reference to FIG. 5, a molding die 20 for foam-molding the seat pad 3 will be described. FIG. 5 is a plan view of the molding die 20 for foam-molding the seat pad 3 according to a first embodiment of the present invention. Note that a lower die included in the molding die 20 is shown in FIG. 5. The lower die is used to form the mounting surface 3a of the seat pad 3. The upper die used to form a cavity between the lower die and the upper die is not shown.

As shown in FIG. 5, the molding die 20 includes a die bottom part 21 having an inner surface used to form the mounting surface 3a of the seat pad 3, a die wall part 22 erected along the outer peripheral edge of the die bottom part 21, and a ridge-like projecting part 23 formed to project like ridges in a predetermined location on the die bottom part 21. The ridge-like projecting part 23 is for forming the groove portion 6 of the seat pad 3 and includes recessed accommodation parts 23a for accommodating clip fixing jigs 30 at plural locations spaced apart by a predetermined distance. The clip fixing jigs 30 accommodated in the accommodation parts 23a are fixed to the die bottom part 21, for example, using screws.

Figure 6A:
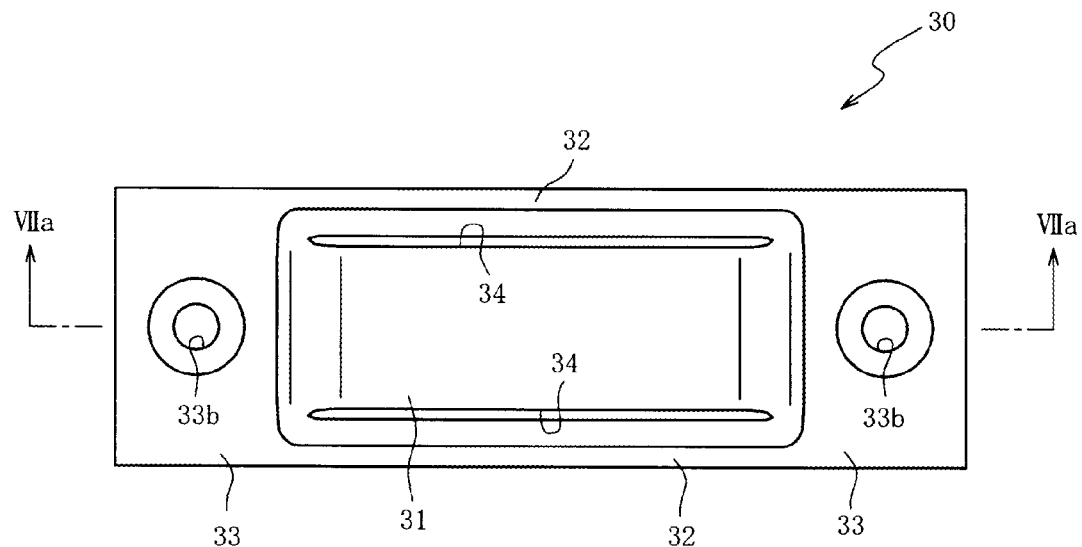
FIG. 6a is a plan view of a clip fixing jig.
Figure 6B:
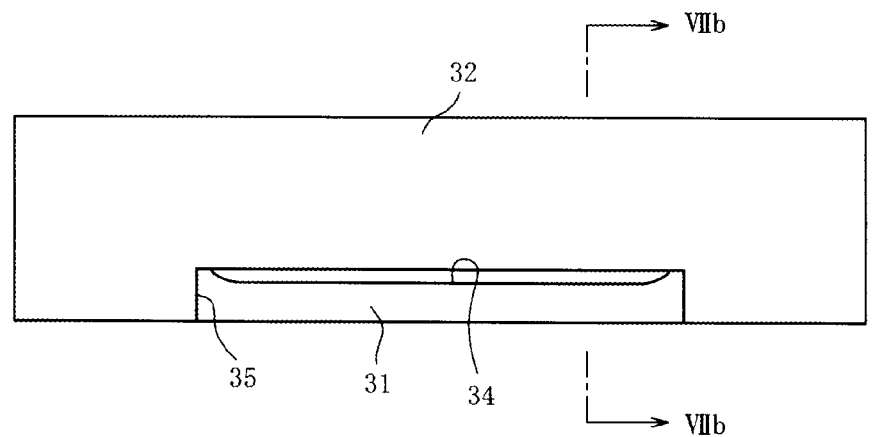
FIG. 6b is a side view of the clip fixing jig.
Figure 7A:
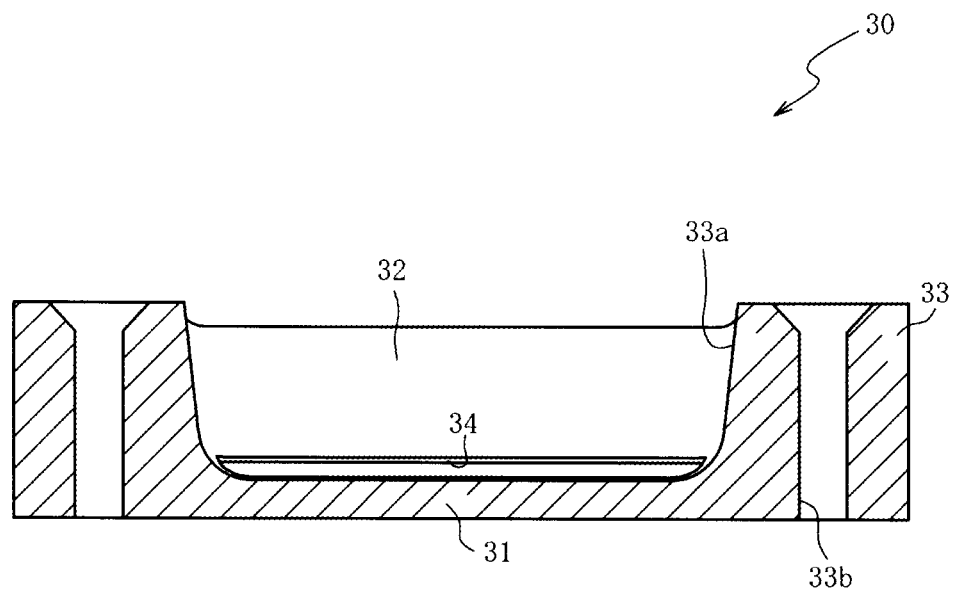
Figure 7B:
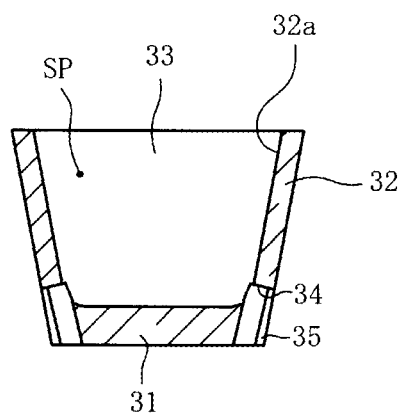
FIG. 7b is a sectional view of the clip fixing jig taken along line VIIb-VIIb in FIG. 6b.

Next, with reference to FIGS. 6 to 8, the clip fixing jigs 30 will be described. First, with reference to FIGS. 6 and 7, the structure of each clip fixing jig 30 will be described. FIG. 6a is a plan view of a clip fixing jig 30; FIG. 6b is a side view of the clip fixing jig 30; FIG. 7a is a sectional view of the clip fixing jig taken along line VIIa-VIIa in FIG. 6a; and FIG. 7b is a sectional view of the clip fixing jig 30 taken along line VIIb-VIIb in FIG. 6b.

As shown in FIGS. 6a and 6b, the clip fixing jig 30 is approximately rectangularly formed to be horizontally long in a side view. In the present embodiment, the clip fixing jig 30 is integrally formed of a ferrous material. As shown in FIG. 6a to FIG. 7b, the clip fixing jig 30 has a bottom part 31, and wall parts 32 and 33 erected along a whole outer peripheral edge of the bottom part 31. Catching openings 34 are formed through portions on the bottom part 31 side of the wall parts 32 and 33.

The bottom part 31 is for connecting the wall parts 32 and 33 to, thereby, secure the mechanical strength of the clip fixing jig 30 and is formed like a rectangular plate in a plan view. The wall parts 32 are erected along a pair of long-side outer edges of the bottom part 31. Inner wall surfaces 32a (see FIG. 7b) of the mutually opposing wall parts 32 are inclined such that the distance between them is smaller in the direction from the top ends of the wall parts 32 toward the bottom part 31. When the clip fixing jig 30 is accommodated in an accommodation part 23a, the wall parts 32 are positioned along the longitudinal direction of the ridge-like projecting part 23.

The wall parts 33 are erected along a pair of short-side outer edges of the bottom part 31. Inner wall surfaces 33a (see FIG. 7a) of the mutually opposing wall parts 33 are inclined such that the distance between them is smaller in the direction from the top ends of the wall parts 33 toward the bottom part 31. The wall parts 33 are formed to be thicker than the wall parts 32. Each of the wall parts 33 has a through-hole 33b formed through the height thereof (in the direction vertical to the plane of FIG. 6a). The through-hole 33b has a female-threaded inner surface. By clamping a screw (not shown) which is screwed in each through-hole 33b to the die bottom part 21, the clip fixing jig 30 accommodated in an accommodation part 23a (see FIG. 5) is fixed to the die bottom part 21. An accommodation space SP surrounded by the wall parts 32 and 33 is formed above the bottom part 31. The accommodation space SP is for accommodating the extending parts 12 of a clip member 5.

The catching openings 34 are elongated openings formed in portions on the bottom part 31 side of the wall parts 32 and 33. They are each formed through the thickness of the wall part 32 (in the upper-lower direction in FIG. 6a) on the corresponding side to be open along the longitudinal direction of the wall part 32 (in the lateral direction in FIG. 6a) on the corresponding side, and they partly cut into, on both sides in the width direction of the inner wall surface 33a of the wall part 33 on each side, the wall part 33 on each side in the thickness direction thereof (in the lateral direction in FIG. 6a). As shown in FIG. 7b, the upper boundary of each catching opening 34 formed through the wall part 32 on the corresponding side, i.e. through from the inner wall surface 32a of the wall part 32 to the outer wall surface is inclined to be higher in the direction from the outer wall surface toward the inner wall surface 32a of the wall part 32. The length (the lateral dimension in FIG. 6a) of each catching opening 34 is larger than the length (the lateral dimension in FIG. 4) of each guide part 14 (see FIG. 4).

Each recessed part 35 is a recessed portion formed on an outer surface portion on the bottom part 31 side of each wall part 32. The recessed parts 35 each have a horizontally long, rectangular form in a side view. The upper boundary of each recessed part 35 is flush with the upper boundary of the corresponding catching opening 34. Right and left end portions of each recessed part 35 are outside both end portions of the corresponding catching opening 34. With the recessed parts 35 formed, each wall part 32 has a reduced thickness, so that the catching openings 34 can be formed through the wall parts 32 with ease.

Next, with reference to FIG. 8, a clip fixing jig 30 with a clip member 5 fixed thereto will be described. FIG. 8 is a sectional view of a clip fixing jig 30 and a clip member 5 fixed to each other. The sectional view shown in FIG. 8 is one taken along a direction perpendicular to the longitudinal direction of the ridge-like projecting part 23 of the molding die 20 (see FIG. 5). The clip fixing jig 30 is accommodated, with the bottom part 31 thereof down, in an accommodation part 23a recessedly formed in the ridge-like projecting part 23. The outer side surfaces toward the upper ends of the respective wall parts 32 of the clip fixing jig 30 accommodated in the accommodation part 23a are formed to approximately fit the inner side surfaces of the ridge-like projecting part 23. This prevents the ridge-like projecting part 23 from forming a large undercut relative to the wall part 32 on each side, so that demoldability of the foam-molded seat pad 3 is secured.

Figure 8:
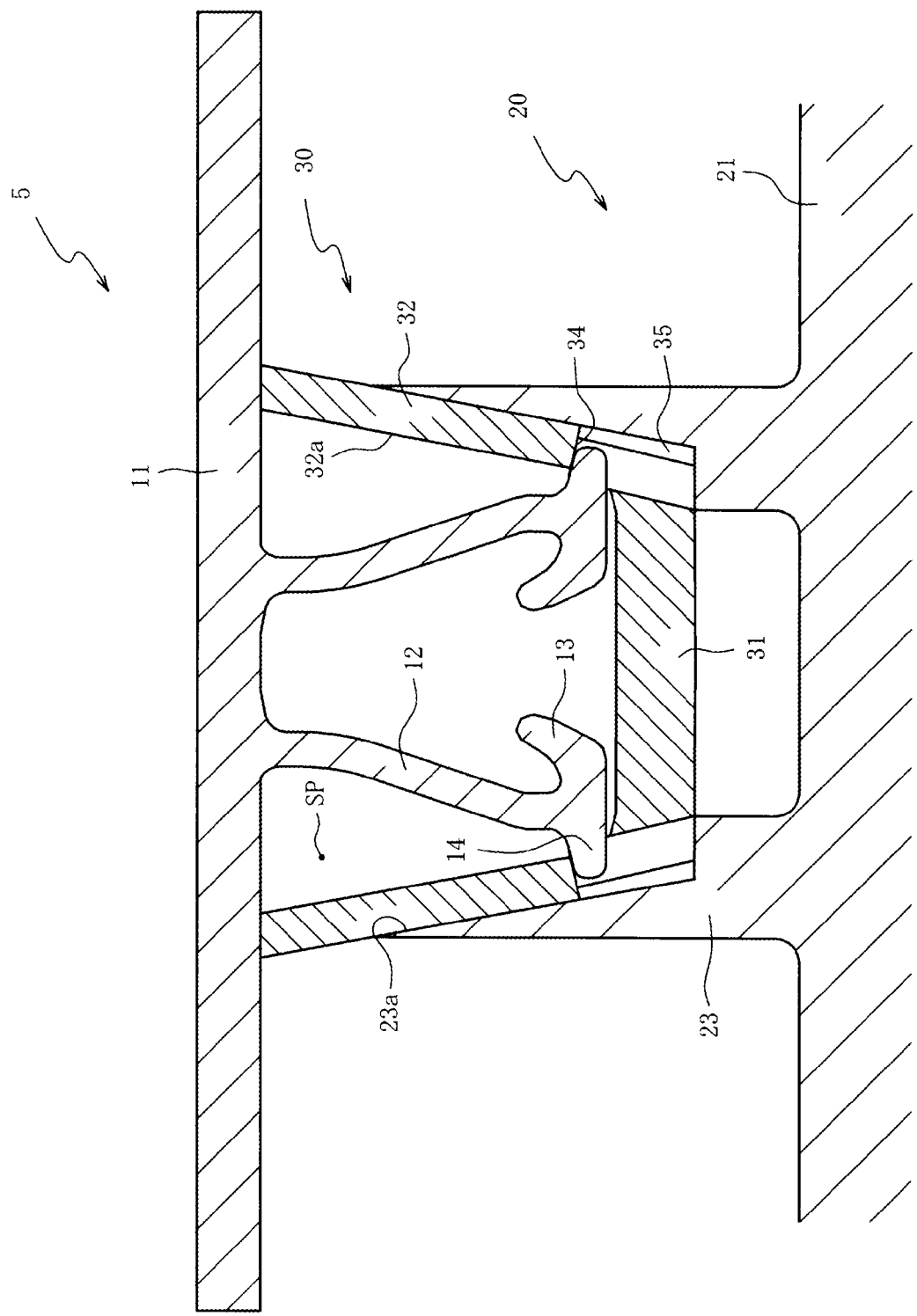
FIG. 8 is a sectional view of the clip fixing jig and the clip member fixed to each other.

As shown in FIG. 8, the clip fixing jig 30 is formed such that the distance between the mutually opposing inner wall surfaces 32a is, at the upper ends of the wall parts 32, larger than the distance (the lateral dimension in FIG. 8) between the end portions of the guide parts 14. Therefore, when the extending parts 12 of the clip member 5 are entered in the space surrounded by the wall parts 32 and 33, the inner wall surfaces 32a on the upper end sides of the wall parts 32 can be kept from contacting the guide parts 14. Also, the distance between the mutually opposing inner wall surfaces 33a (see FIG. 7a) is, on the upper end sides of the wall parts 33, smaller than the length (the lateral dimension in FIG. 4) of each extending part 12 at the end portion thereof. Furthermore, the mutually opposing inner wall surfaces 32a and the mutually opposing inner wall surfaces 33a are inclined such that the distances between the mutually opposing inner wall surfaces 32a and between the mutually opposing inner wall surfaces 33a are smaller in the direction from the top ends of the wall parts 32 and 33 toward the bottom part 31. This prevents interference between the clip fixing jig 30 and the clip member 5 and makes it easy to insert the extending part 12 of the clip member 5 in the space (accommodation space SP) surrounded by the wall parts 32 and 33.

The distance between the inner wall surfaces 32a is, on the bottom part 31 side, smaller than the distance (the lateral dimension in FIG. 8) between the end portions of the guide parts 14. The extending parts 12 are elastically deformable toward each other or away from each other. Therefore, as the guide parts 14 come closer to the bottom part 31, the end portions of the guide parts 14 start being pressed by the inner wall surfaces 32a to cause the extending parts 12 to be elastically deformed toward each other. This restricts movement, in the direction (in the lateral direction in FIG. 8) in which the inner wall surfaces 32a oppose each other, of the extending parts 12 of the clip member 5, so that the clip member 5 can be set in position between the wall parts 32 (in the width direction of the ridge-like projecting part 23 (see FIG. 5)).

The distance between the inner wall surfaces 33a (see FIG. 7a) is, on the bottom part 31 side of the wall parts 33, approximately the same as the length of the extending parts 12 and guide parts 14 on their end portion sides. This restricts movement, in the direction (in the direction vertical to the plane of FIG. 8) in which the inner wall surfaces 33a oppose each other, of the extending parts 12 of the clip member 5, so that the clip member 5 can be set in position between the wall parts 33 (in the longitudinal direction of the ridge-like projecting part 23 (see FIG. 5)).

When the guide parts 14 of the clip member 5 inserted in the clip fixing jig 30 reach the catching openings 34 formed through the wall parts 32, the extending parts 12 elastically deformed toward each other are released to move back away from each other. As a result, the guide parts 14 are inserted into the catching openings 34 to be caught there. At this time, the upper end faces along the whole upper-end length of the wall parts 32 and 33 come into contact with the buried part 11 of the clip member 5. As a result, movement of the clip member 5 in the height direction (in the upper-lower direction in FIG. 8) of the clip fixing jig 30 is restricted, so that the clip member 5 can be set in position in the height direction of the clip fixing jig 30.

As described above, just by inserting the extending parts 12 of the clip member 5 in the accommodation space SP of the clip fixing jig 30, the clip member 5 can be set in position relative to the clip fixing jig 30 both in the horizontal direction and the height direction. With large clearances secured between the wall parts 32 and 33 and the extending parts 12, the extending parts 12 of the clip member 5 can be very easily inserted into the accommodation space SP of the clip fixing jig 30. Thus, workability in fixing the clip member 5 is improved.

In the above state, the seat pad 3 (see FIG. 3) is foam-molded. Since the clip member 5 is set in position in both the horizontal direction and the vertical direction relative to the clip fixing jig 30, the clip member 5 is prevented from moving when the synthetic resin to form the seat pad 3 is foamed. This allows a portion (the buried part 11) of the clip member 5 to be buried in a predetermined position.

Also, since the upper end faces along the whole upper-end length of the wall parts 32 and 33 come into contact with the buried part 11 of the clip member 5, when the seat pad 3 is foam-molded, it does not occur that part of the foamed molding material enters the accommodation space SP of the clip fixing jig 30. If part of the foamed molding material enters the accommodation space SP of the clip fixing jig 30 and adheres to the extending parts 12 or claw-like parts 13, it may become difficult to have the locking part 7 provided on the reverse side of the seat cover 4 (see FIG. 3) caught by the claw-like parts 13 (to attach the seat cover 4 to the seat pad 3). Since such difficulty can be prevented, workability in attaching the seat cover 4 to the seat pad 3 can be secured.

When the foam-molded seat pad 3 is detached from the molding die 20, the clip member 5 is moved upward (upward in FIG. 8) relative to the clip fixing jig 30. This causes the guide parts 14 caught in the catching openings 34 to turn about the end portions of the extending parts 12 while being pressed by the upper boundary faces of the catching openings 34 and being elastically deformed. As a result, the guide parts 14 leave the catching openings 34 allowing the clip fixing jig 30 and the clip member 5 to be detached from each other.

The upper boundaries of the catching openings 34 formed through the wall parts 32, i.e. from the inner wall surfaces 32a through the outer wall surfaces, respectively, are inclined to be higher in the direction from the outer surfaces of the wall parts 32 toward the inner wall surfaces 32a. Therefore, the guide parts 14 caught in the catching openings 34 can be moved out of the catching openings with a relatively small force. This prevents the seat pad 3 from being broken at its portion where the clip member 5 is buried.

Furthermore, the underside surfaces (surfaces on the buried part 11 side) of the guide parts 14 are inclined to be further away from the buried part 11 in the direction from the base portions (on the extending part 12 sides) toward the end portions of the guide parts 14, respectively. Therefore, when the clip member 5 is moved upward (upward in FIG. 8) relative to the clip fixing jig 30, the guide parts 14 caught in the catching openings 34 can be released from the catching openings 34 with ease.

Also, the projection (length of projection) from the extending part 12 of each guide part 14 is smaller than the projection (length of projection) from the extending part 12 of the corresponding claw-like part 13. This makes it possible to release the guide parts 14 from the catching openings 34 by making the guide parts 14 turn about the end portions of the extending parts 12, respectively, without requiring the guide parts 14 to turn so much as required in cases where the projections of the guide parts 14 are larger than the projections of the claw-like parts 13. In this way, when detaching the foam-molded seat pad 3 from the molding die 20, the guide parts 14 can be released from the catching openings 34 with ease.

Next, with reference to FIGS. 9 to 11, a second embodiment of the present invention will be described. It has been described for the first embodiment that, in order to fix each clip member 5 including guide parts 14 projecting from the end portions of the extending parts 12 in the directions away from each other, catching openings 34 are formed through the wall parts 32 of the clip fixing jig 30. For the second embodiment, a clip fixing jig 50 for fixing a clip member 40 having no guide parts 14 will be described. The parts of the second embodiment identical to those described in connection with the first embodiment will be denoted by reference numerals identical to those used in the first embodiment and description of such parts will be omitted in the following.

Figure 9:
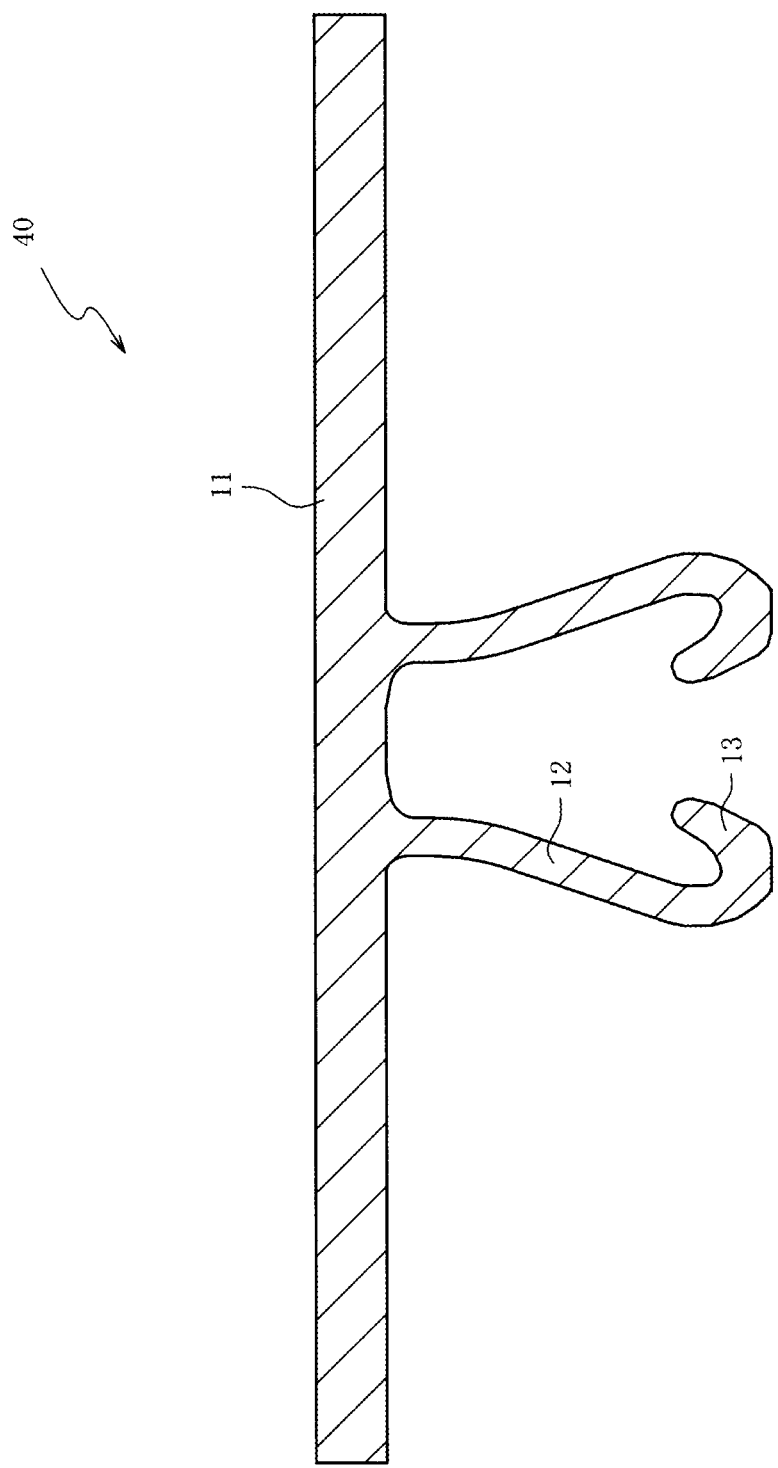
FIG. 9 is a sectional view of a clip member to be fixed to a clip fixing jig according to a second embodiment.

FIG. 9 is a sectional view of a clip member 40 to be fixed to a clip fixing jig 50 according to the second embodiment; FIG. 10*a* is a plan view of the clip fixing jig 50; FIG. 10*b* is a side view of the clip fixing jig 50; and FIG. 10*c* is a sectional view of the clip fixing jig 50 taken along line Xc-Xc in FIG. 10*b*. As shown in FIG. 9, the clip member 40 is structured identically to the clip member 5 described in connection with the first embodiment except that the guide parts 14 (see FIG. 3) are not included in the clip member 40.

As shown in FIGS. 10*a* to 10*c*, the clip fixing jig 50 is approximately rectangularly formed to be horizontally long in a side view and includes a bottom part 31, wall parts 32 and 33 erected along a whole outer peripheral edge of the bottom part 31 and an erect part 51 erected on the bottom part 31. The erect part 51 is a part erected on a central portion of the bottom part 31 to be spaced apart from the wall parts 32 and 33 by predetermined distances and to extend in parallel with the wall parts 32 and has a tapered shape such that its thickness in the direction in which it opposes the wall parts 32 is smaller toward the end portion thereof. The erect part 51 has, on both sides thereof opposing the wall parts 32, catching depressed parts 52 for catching claw-like parts 13. The catching depressed parts 52 are formed on both sides of the erect part 51 to be depressed approximately at a center in the height direction of the erect part 51.

Next, with reference to FIG. 11, a clip fixing jig 50 with a clip member 40 fixed thereto will be described. FIG. 11 is a sectional view of the clip fixing jig 50 and the clip member 40 fixed to each other. The molding die to which the clip fixing jig 50 is fixed is not shown.

Figure 11:
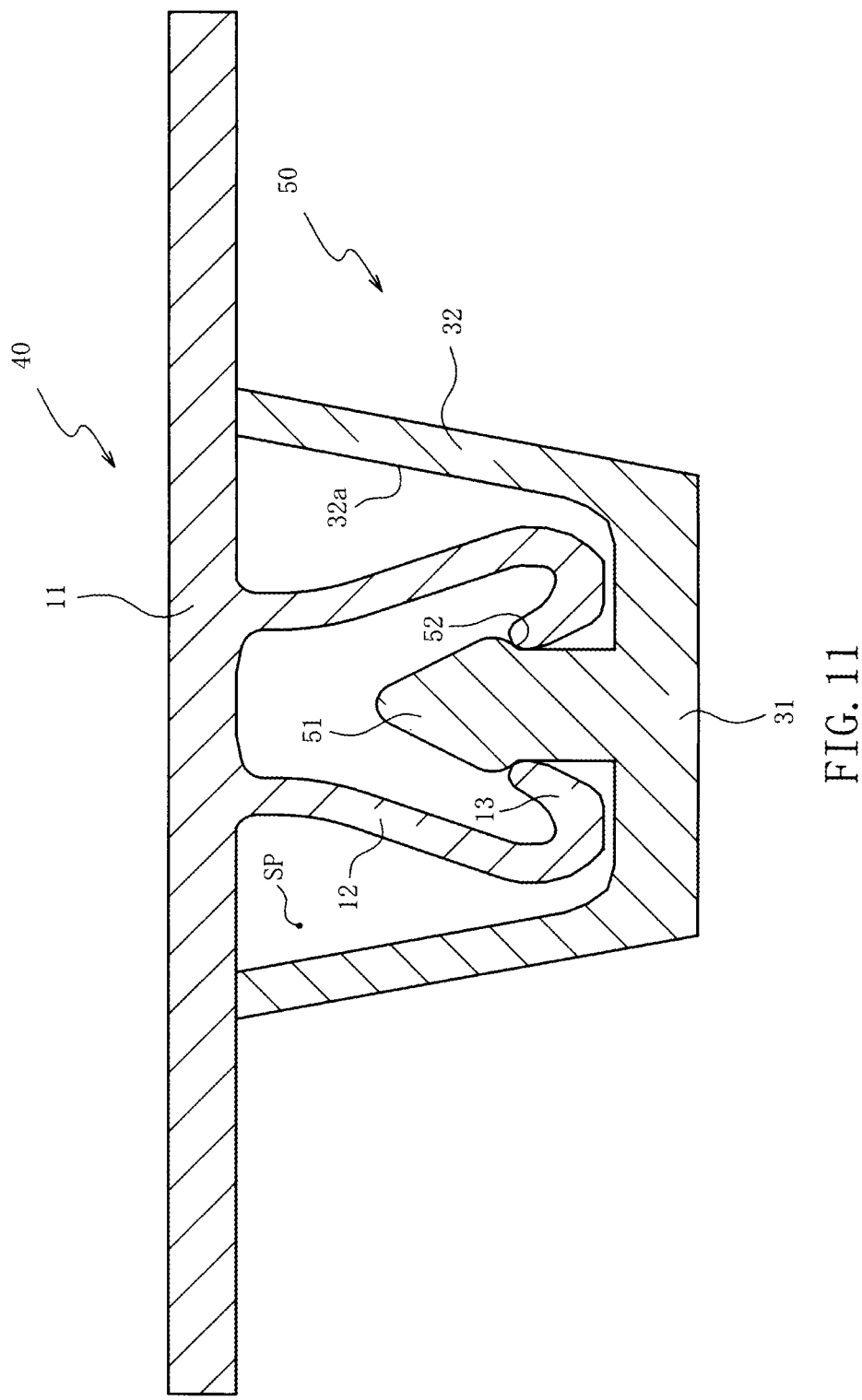
FIG. 11 is a sectional view of the clip fixing jig and the clip member fixed to each other.

As shown in FIG. 11, to fix the clip member 40 to the clip fixing jig 50 attached to the molding die (not shown), the extending parts 12 of the clip member 40 are inserted into the accommodation space SP of the clip fixing jig 50. When the extending parts 12 of the clip member 40 are inserted in the accommodation space SP, the erect part 51 is inserted between the claw-like parts 13. When the claw-like parts 13 reach where the catching depressed parts 52 are formed, the claw-like parts 13 are caught by the catching depressed parts 52 thanks to elastic deformation of the extending parts 12. At this time, the upper end faces along the whole upper-end length of the wall parts 32 and 33 come into contact with the buried part 11 of the clip member 40. As a result, movement of the clip member 40 in the height direction of the clip fixing jig 50 (upper-lower direction in FIG. 11) is restricted.

On the other hand, movement of the clip member 40 in the direction (the lateral direction in FIG. 11) in which the wall parts 32 of the clip fixing jig 50 oppose each other is restricted with the erect part 51 inserted between the elastically deformable extending parts 12. Also, movement of the clip member 40 in the direction (the lateral direction in FIG. 10*a*) in which the wall parts 33 of the clip fixing jig 50 oppose each other is restricted by the clearances generated by the difference between the distance between the wall parts 33 on the bottom part 31 side and the corresponding dimensions of the extending parts 12. Thus, the clip member 40 can be set in position in both the horizontal direction and the height direction of the clip fixing member 50.

As described above, just by inserting the extending parts 12 of the clip member 40 into the accommodation space SP of the clip fixing jig 50, the clip member 40 can be set in position relative to the clip fixing jig 50 in both the horizontal direction and the height direction. Since large clearances are formed between the wall parts 32 and 33 and the extending parts 12, the extending parts 12 of the clip member 40 can be very easily inserted into the accommodation space SP of the clip fixing jig 50. This improves workability in fixing the clip member 40.

Next, with reference to FIGS. 12 and 13, a third embodiment of the present invention will be described. It has been described for the second embodiment that the erect part 51 having the catching depressed parts 52 is erected on the bottom part 31. For the third embodiment, a clip fixing jig 70 having catching openings 71 formed through the bottom part 31 will be described. The parts of the third embodiment identical to those described in connection with the first embodiment will be denoted by reference numerals identical to those used in the first embodiment and description of such parts will be omitted in the following.

Figure 12C:
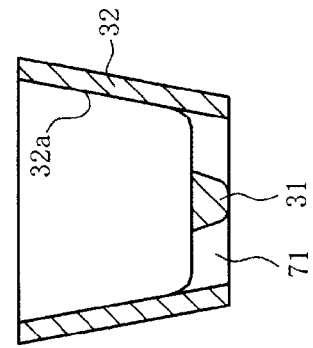
FIG. 12c is a sectional view of the clip fixing jig taken along line XIIc-XIIc in FIG. 12b.
Figure 12A:
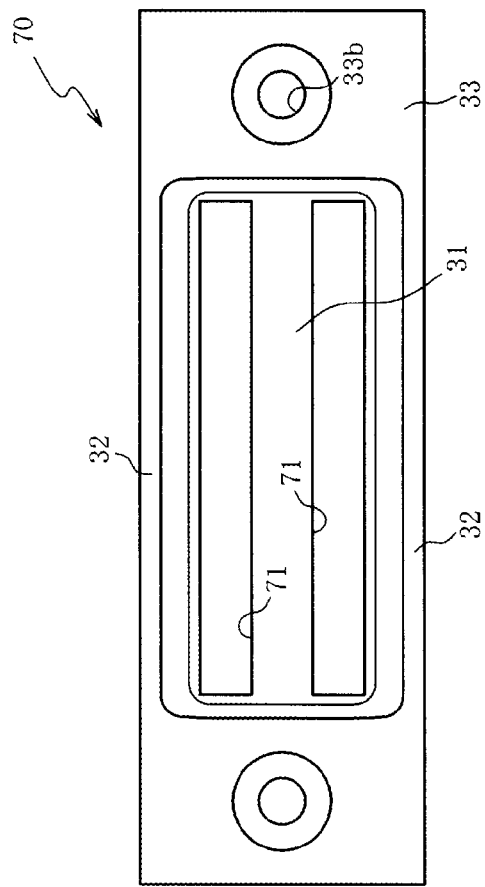
FIG. 12a is a plan view of a clip fixing jig according to a third embodiment.
Figure 12B:
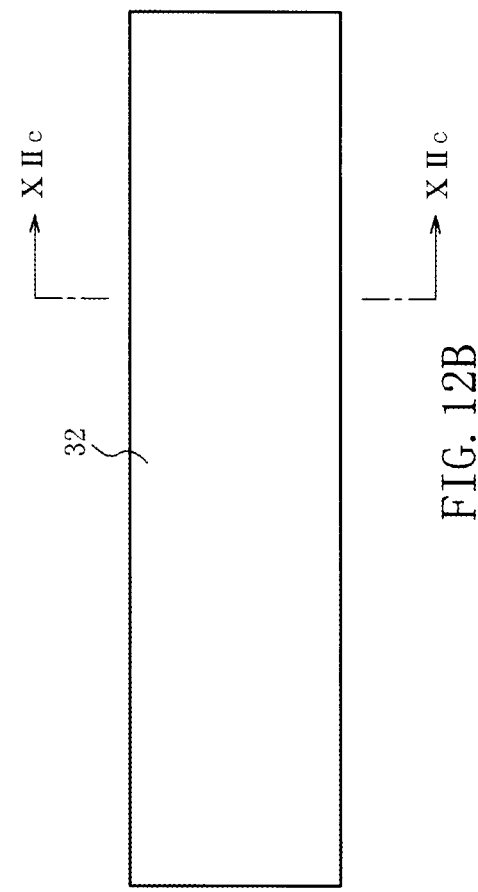
FIG. 12b is a side view of the clip fixing jig.

FIG. 12*a* is a plan view of a clip fixing jig 70; FIG. 12*b* is a side view of the clip fixing jig 70; FIG. 12*c* is a sectional view of the clip fixing jig 70 taken along line XIIc-XIIc in FIG. 12*b*; and FIG. 13 is a sectional view of a clip fixing jig 70 and a clip member 60 fixed to each other. The molding die to which the clip fixing jig 70 is fixed is not shown in FIG. 13. As shown in FIG. 13, the clip member 60 is structured identically to the clip member 40 described in connection with the second embodiment except that extending parts 61 are formed to be a little longer.

As shown in FIGS. 12*a* to 12*c*, the clip fixing jig 70 is approximately rectangularly formed to be horizontally long in a side view and includes a bottom part 31, wall parts 32 and 33 erected along a whole outer peripheral edge of the bottom part 31 and the catching openings 71 formed through the bottom part 31 to catch the claw-like parts 13. The catching openings 71 are elongated openings formed through, in the thicknesses direction (in the direction vertical to the plane of FIG. 12*a*), two portions of the bottom part 31 to be parallel to each other and to longitudinally (in the lateral direction in FIG. 12*a*) extend along the wall parts 32.

Figure 13:
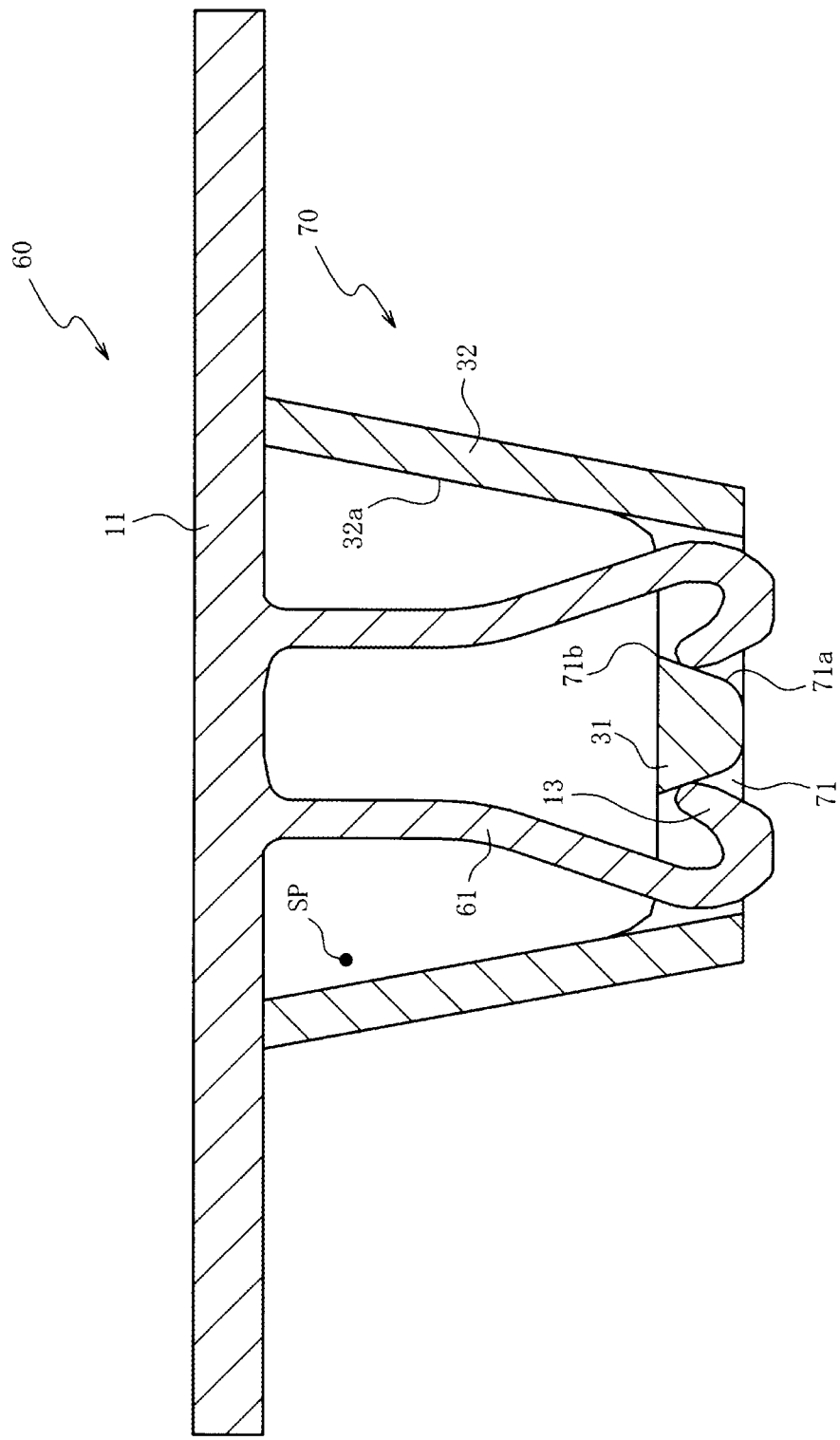
FIG. 13 is a sectional view of the clip fixing jig and the clip member fixed to each other.

As shown in FIG. 12*c* and FIG. 13, of the inner surfaces of each catching opening 71 formed through, in the thickness direction, the bottom part 31, an inner surface 71*a* on the center side, in the direction in which the wall parts 32 oppose each other, is inclined into an undercut state such that the inner surface 71*a* projects more outwardly, in the direction in which the wall parts 32 oppose each other, in upper portions thereof than in lower portions thereof in the thickness direction of the bottom part 31. Also, upper edges 71*b* on the upper side in the thickness direction of the bottom part 31 of the inner surfaces 71*a* are positioned such that, when the end portions of the extending parts 61 and the claw-like parts 13 of the clip member 60 are inserted into the catching openings 71, respectively, the upper edges 71*b* interfere with the claw-like parts 13.

As shown in FIG. 13, to fix the clip member 60 to the clip fixing jig 70 attached to the molding die (not shown), the extending parts 61 of the clip member 60 are inserted into the accommodation space SP of the clip fixing jig 70. When the extending parts 61 of the clip member 60 are inserted in the accommodation space SP and the claw-like parts 13 reach the upper edges 71*b* of the catching openings 71, the extending parts 61 are elastically deformed away from each other, thereby allowing the claw-like parts 13 to be inserted into the catching openings 71. When the claw-like parts 13 are inserted into the catching openings 71, the elastically deformed extending parts 61 are restored into an undeformed state causing the claw-like parts 13 to come into contact with the inner surfaces 71a of the catching openings 71, respectively. At this time, the upper end faces along the whole upper-end length of the wall parts 32 and 33 come into contact with the buried part 11 of the clip member 60. As a result, movement of the clip member 60 in the height direction of the clip fixing jig 70 (upper-lower direction in FIG. 13) is restricted.

On the other hand, movement of the clip member 60 in the direction (the lateral direction in FIG. 13) in which the wall parts 32 of the clip fixing jig 70 oppose each other is restricted as the extending parts 61 are elastically deformed causing the claw-like parts 13 to be pressed against the inner surfaces 71a of the catching openings 71. Also, movement of the clip member 60 in the direction (the lateral direction in FIG. 12a) in which the wall parts 33 of the clip fixing jig 70 oppose each other is restricted by the clearances generated by the difference between the distance between the wall parts 33 on the bottom part 31 side and the corresponding dimensions of the extending parts 61. Thus, the clip member 60 can be set in position in both the horizontal direction and the height direction of the clip fixing member 70.

As described above, just by inserting the extending parts 61 of the clip member 60 into the accommodation space SP of the clip fixing jig 70, the clip member 60 can be set in position relative to the clip fixing jig 70 in both the horizontal direction and the height direction. Since large clearances are formed between the wall parts 32 and 33 and the extending parts 61, the extending parts 61 of the clip member 60 can be very easily inserted into the accommodation space SP of the clip fixing jig 70. This improves workability in fixing the clip member 60.

Figure 14A:
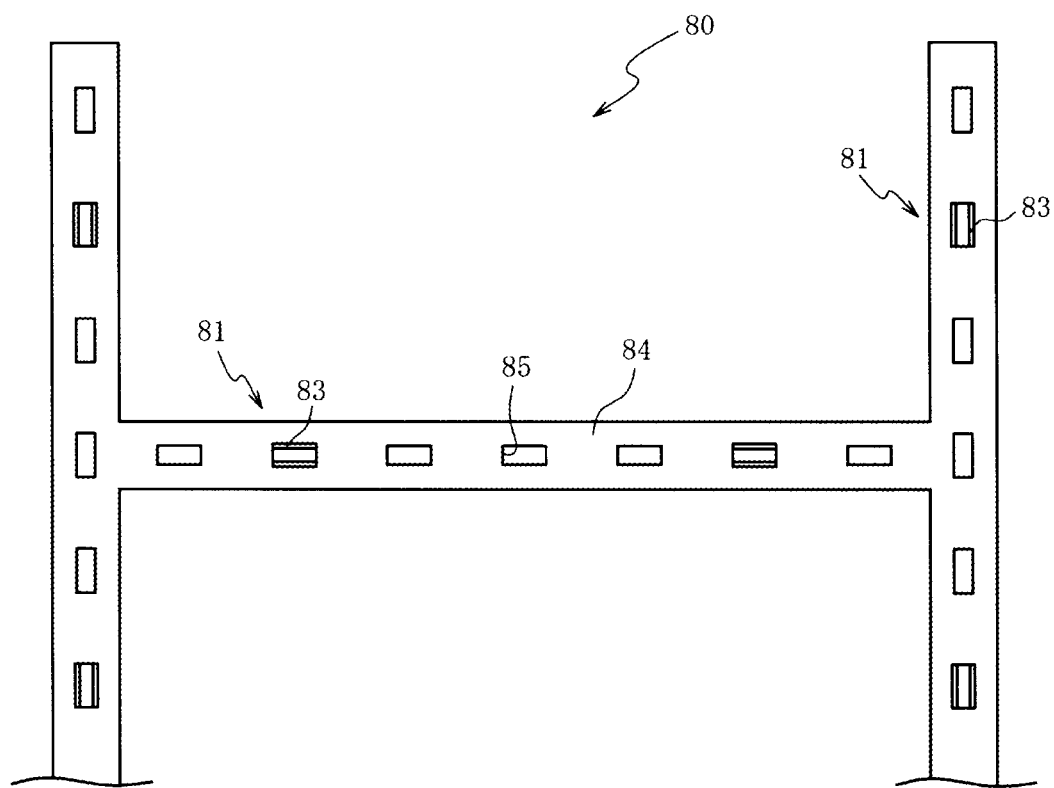
FIG. 14a is a plan view of a clip member according to a fourth embodiment.

Next, with reference to FIG. 14, a fourth embodiment of the present invention will be described. It has been described for the first to third embodiments that, by having the claw-like parts 13 and guide parts 14 included in the clip members 5, 40 or 60 caught by the catching openings 34 or 71 or catching depressed parts 52 included in the clip fixing jigs 30, 50 or 70, the clip members 5, 40 and 60 are fixed to the clip fixing jigs 30, 50 and 70, respectively. For the fourth embodiment, using a magnetic force (attraction force) to attract (fix) a clip member 80 to a clip fixing jig 90 will be described. The parts of the fourth embodiment identical to those described in connection with the first embodiment will be denoted by reference numerals identical to those used in the first embodiment and description of such parts will be omitted in the following. FIG. 14a is a plan view of a clip member 80 according to the fourth embodiment, and FIG. 14b is a sectional view of a clip fixing jig 90 and the clip member 80 fixed to each other.

As shown in FIG. 14a, the clip member 80 includes plural clips 81 and a connection member 84 connecting the plural clips 81 at their base parts. The connection member 84 is formed of a belt-like magnetic material (ferrous material in the present embodiment) to be identical, in a plan view, to the ridge-like projecting part 23 (see FIG. 5) of the molding die 20 and has lined-up through-holes 85 formed therethrough in the thickness direction (the direction vertical to the plane of FIG. 14a). The connection member 84 has a width which allows the upper-end faces of a pair of wall parts 32 of the clip fixing jig 90 to come into contact with the connection member 84.

The through-holes 85 are for fixing the clips 81 to predetermined locations of the connection member 84. Also, when the connection member 84 is buried in the seat pad 3 (see FIG. 3), it generates an anchoring effect with the foamed molding material having entered thereinside. The clip member 80 holds the clips 81 correspondingly to the clip fixing jigs 90 placed in the molding die 20.

Figure 14B:
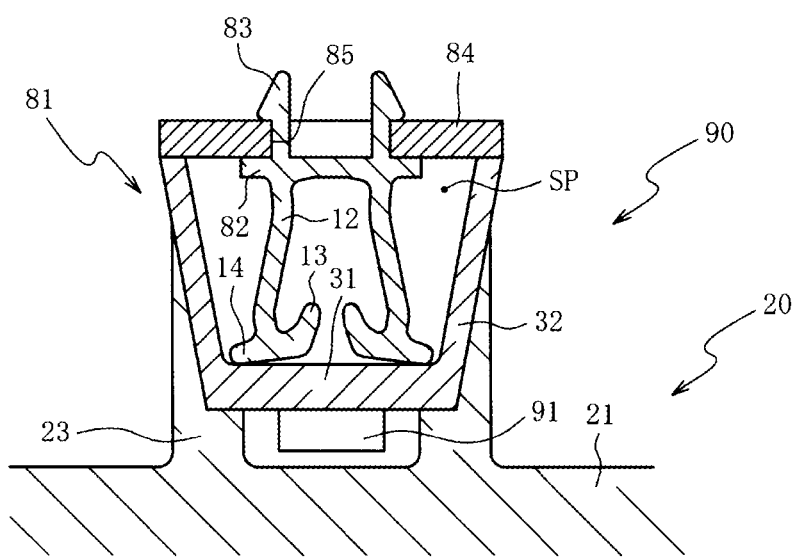
FIG. 14b is a sectional view of a clip fixing jig and the clip member fixed to each other.

As shown in FIG. 14b, each clip 81 includes a plate-like flange part 82 to be in contact with one side of the connection member 84, a pair of extending parts 12 projectingly extending form the flange part 82, a pair of claw-like parts 13 formed to project, toward each other, from the end portions of the extending parts 12, respectively, and a pair of guide parts 14 formed to extend, away from each other, from the end portions of the extending parts 12, respectively. These parts are integrally formed of elastic synthetic resin or elastic metal.

The flange part 82 is put in contact with one side of the connection member 84 and has an outer diameter (shape) which cannot pass through the through-hole 85. The flange part 82 is provided with a pair of catching parts 83 projecting from the side thereof opposite to the side from which the extending parts 12 project. The catching parts 83 are thin plate-like parts projecting from the flange part 82 to be spaced apart from each other by a predetermined distance and are elastically deformable away from each other and toward each other. The catching parts 83 are inserted through the through-hole 85 formed through the connection member 84, have claw-like parts which are put in contact with the opposite side of the connection part 84 and which project in the directions away from each other. In this arrangement, when the catching parts 83 are put through the through-hole 85 of the connecting member 84, the flange part 82 and the catching parts 83 are positioned on the two sides of the connection member 84, respectively, making the clip 81 inseparable from the connection part 84 (through-hole 85).

The clip fixing jig 90 is structured identically to the clip fixing jig 20 described in connection with the first embodiment except that the wall parts 32 do not include the catching openings 34 (see FIG. 8). The clip fixing jig 90 is integrally formed of a magnetic material (ferrous material in the present embodiment) and is placed in the molding die 20 with a permanent magnet 91 magnetically attached to the underside of the bottom part 31. This magnetizes the magnetic clip fixing jig 90 placed in the molding die 20.

To fix the clip member 80 to the clip fixing jig 90 placed in the molding die 20, the extending parts 12 of the clip member 80 are inserted in the accommodation space SP of the clip fixing jig 90. With the clip fixing jig 90 formed of a magnetic material magnetized by the permanent magnet 91, the magnetized wall parts 32 detachably attract the connection member 84 formed of a magnetic material. With the plural clips 81 connected by the connection member 84 and with the plural clip fixing jigs 90 arranged in the locations corresponding to the locations of the clips 81, the clip member 80 with the plural clips 81 arranged thereon can be magnetically attached (fixed) altogether to the clip fixing jigs 90 without requiring the clips 81 to be fixed to the clip fixing jigs 90 one by one. This greatly improves workability in fixing the clip members 80.

Even though the present invention has been described based on embodiments, the present invention is not at all limited to the above embodiments, and it is obvious that the present invention can be improved or modified in various ways without departing from the spirit and scope of the present invention. For example, the shapes of parts used in the above embodiments are mere examples, and it is, of course, possible that such parts be alternatively shaped.

Even though, for the above embodiments, the molding die 20 and clip fixing jigs 30, 50, 70 and 90 used to form the seat pad 3 for the cushion pad 1 have been described, application of the present invention is not necessarily limited to such parts. It is obviously possible to apply the present invention to a molding die and clip fixing jigs used to form a seat pad for the back pad 2.

Even though, for the above embodiments, cases where the clip fixing jigs 30, 50, 70 and 90 are not integrated with the molding die 20 have been described, the clip fixing jigs 30, 50, 70 and 90 need not necessarily be so. It is obviously possible to form the clip fixing jigs 30, 50, 70, and 90 integrally with the molding die 20.

Even though, for the above first embodiment, a case where the bottom part 31 of the clip fixing jig 30 is formed like a plate, the bottom part 31 need not necessarily be so. The bottom part 31 is intended to secure the mechanical strength of the clip fixing jig 30 by being connected with the wall parts 32 and 33. In cases where the mechanical strength of the clip fixing jig 30 is allowed to be slightly lower, it is obviously possible that the bottom part 31 has an annular form. When the bottom part 31 is annular, it is provided at the lower ends of the wall parts 32 and 33. In this case, it is possible to have the guide parts 14 caught at the underside of the bottom part provided at the lower ends of the wall parts 32. Also, it is obviously possible to form, like in the first embodiment, the catching openings 34 through the wall parts 32 and have the guide parts 14 caught in the catching openings 34.

Even though, for the above fourth embodiment, a case where the clip fixing jig 90 is magnetized by the permanent magnet 91 has been described, the arrangement need not necessarily be so. It is obviously possible to have the clip fixing jig 90 magnetized by an electromagnet.

Other technical idea of the molding die, the molding die for molding a seat pad include a plurality of the clip fixing jigs each arranged therein. The clip member includes a plurality of clips which are each provided with the extending part and the claw-like part and a connection member for connecting the clips. The connection member being formed of a magnetic material. A magnet for magnetizing the clip fixing jigs is provided. The clip fixing jigs are made of a magnetic material and are located correspondingly to the locations of the clips. The wall parts of the clip fixing jigs are magnetized by the magnet and detachably attract the connection member.

The clip member includes plural clips which are each provided with the extending part and the claw-like part and a connection member which is formed of a magnetic material and connects the clips. The clip fixing jigs are formed of a magnetic material and are magnetized by a magnet. The wall parts of the magnetized clip fixing jigs detachably attract the connection member. With the plural clips connected by the connection member and with the clip fixing jigs located correspondingly to the locations of the clips, the clip member can be fixed altogether to the clip fixing jigs without requiring the clips to be fixed to the clip fixing jigs one by one. Therefore, in addition to the effect generated, workability in clip member fixing work is greatly improved.

The invention claimed is:

1. A clip fixing jig for fixing a clip member in a molding die for molding a seat pad, the clip member having a buried part to be buried in the seat pad provided with a groove portion to accommodate a portion of a seat cover, an extending part extending from the buried part into the groove portion, and a claw-like part formed to project from an end portion of the extending part and to catch a locking part provided on a reverse side of the seat cover, the clip fixing jig comprising:
    a plate-like or annular bottom part;
    a wall part which is erected along a whole outer peripheral edge of the bottom part and which forms, above the bottom part, an accommodation space for accommodating the extending part; and
    a fixing part for detachably fixing a predetermined part of the clip member, the fixing part being formed at a part of the clip fixing jig provided in the accommodation space or being formed in the bottom part or the wall part,
    wherein mutually opposing inner surfaces of the wall part are inclined from an upper end of the wall part to a bottom part such that a distance between the mutually opposing inner surfaces is smaller in a direction from the upper end of the wall part toward the bottom part, whereas, in the direction in which the inner surfaces of the wall part oppose each other, movement of the extending part of the clip member is restricted.

2. The clip fixing jig according to claim 1,
    wherein said mutually opposing inner surfaces of the wall part that are inclined include a pair of mutually opposing wall parts along long-side outer edges of the bottom part and a pair of mutually opposing wall parts along short-side outer edges of the bottom part.

3. The clip fixing jig according to claim 1,
    wherein, when the extending part of the clip member is accommodated in the accommodation space, an upper end face along a whole upper-end length of the wall part comes into contact with the buried part.

4. The clip fixing jig according to claim 2,
    wherein, when the extending part of the clip member is accommodated in the accommodation space, an upper end face along a whole upper-end length of the wall part comes into contact with the buried part.

5. The clip fixing jig according to claim 1, further including:
    at least the wall part is formed of a magnetic material, wherein the wall part detachably attracts a connection member that is formed of a magnetic material, and
    a plurality of clips are connected by the connection member.

6. The clip fixing jig according to claim 1,
    wherein said pair of mutually opposing wall parts along the short-side outer edges of the bottom part include through-holes adapted to accommodate clamping screws.

7. The clip fixing jig according to claim 1,
    wherein said pair of mutually opposing wall parts along the short-side outer edges of the bottom part are wider than said pair of mutually opposing wall parts along the long-side outer edges of the bottom part.

8. The clip fixing jig according to claim 7,
    wherein said pair of mutually opposing wall parts along the short-side outer edges of the bottom part include through-holes adapted to accommodate clamping screws.

* * * * *